Dec. 31, 1935.  S. GUARNASCHELLI  2,026,168
LEAKPROOF COUPLING FOR METAL TUBING
Filed April 30, 1934
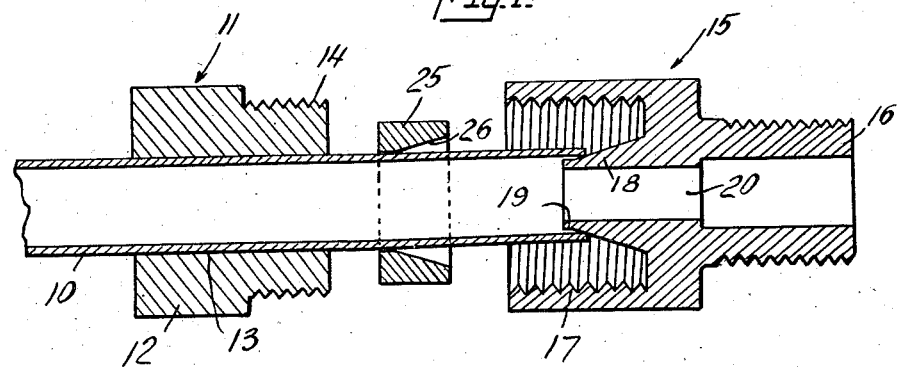
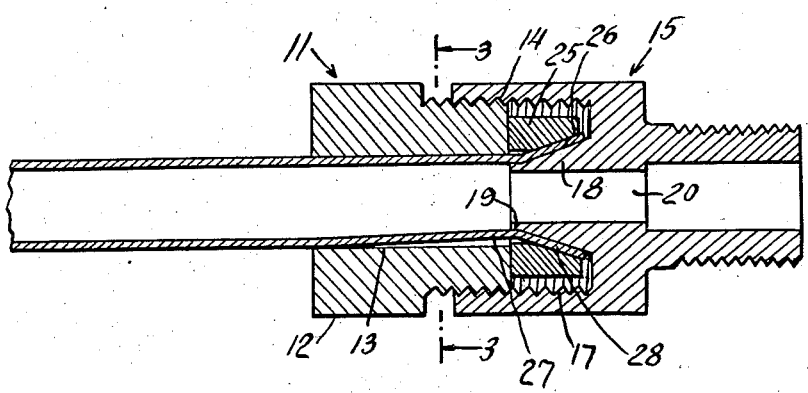
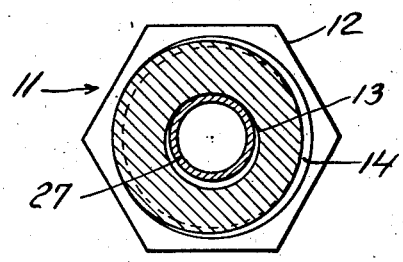
INVENTOR
Stephen Guarnaschelli
BY
Marshall Hawley
ATTORNEYS Patented Dec. 31, 1935

2,026,168

UNITED STATES PATENT OFFICE 2,026,168

LEAK-PROOF COUPLING FOR METAL TUBING

Stephen Guarnaschelli, Brooklyn, N. Y., assignor to Packless Metal Products Corporation, New York, N. Y., a corporation of Delaware Application April 30, 1934, Serial No. 723,087

10 Claims. (Cl. 285—86)

This invention relates to a leak-proof coupling for metal tubing.

Metal tubing, such as copper tubing, is used in many types of machines, as for instance, internal combustion engines, refrigerators, etc. When the tubing breaks it is practically impossible to form a new joint on the broken end and for this reason it is usually necessary to entirely replace the broken section.

This invention has for its salient object to provide a simple and practical method of flaring the end of a metallic tube and at the same time coupling the flared end in a solderless leak-proof joint.

Another object of the invention is to provide a method and apparatus of the character specified so worked out as to require the use of no special tools.

Another object of the invention is to provide a pipe joint or coupling so constructed and arranged that the joint will be leak-proof and will not loosen under vibration.

Another object of the invention is to provide a method of flaring the end of a metal tube so carried out that the tube will not twist or be put under any torsional strain during the flaring operation.

Further objects of the invention will appear from the following specification taken in connection with the drawing which forms a part of this application, and in which Fig. 1 is a longitudinal sectional elevation of a coupling constructed and arranged to carry out the method, the parts being shown separated or in the position taken prior to carrying out the flaring and coupling operation;

Fig. 2 is a view similar to Fig. 1 but showing the parts in the position taken when the operation is completed; and Fig. 3 is a transverse sectional elevation of one of the coupling members taken substantially on line 3—3 of Fig. 2.

The method briefly described consists of flaring the end of a tube of ductile metal by simultaneously forcing the tube longitudinally on a conical seat and exerting lateral pressure against successive circumferential portions of the end of the tube, thus flaring the tube end. The apparatus illustrated for carrying out the method comprises a pair of threaded coupling members having longitudinal bores extending therethrough, the bore in one member being eccentric. The other member is provided with a concentrically arranged centrally disposed projection having a conical seat on which the end of the tube is forced. In order to flare the end of the tube the tube is pressed in the direction of the conical seat on the projection and the threaded member having the eccentric bore is threaded into the other member, thus causing the end of the tube to be pressed against the conical seat and causing the end of the tube to be flared. In order to prevent twisting of the tube during the flaring operation a collar is interposed between the two threaded members and takes the thrust of the threaded member having the eccentric bore therethrough.

Further details of the invention will appear from the following description.

In the form of the invention illustrated in the drawing there is shown a metal tube 10 formed of ductile metal, such as copper. A coupling member 11 is mounted on the tube, this member having a hexagonal end 12 and a cylindrical bore 13 extending therethrough. The other end of the coupling member 11 is threaded, as shown at 14, the bore 13 being eccentrically disposed with reference to the threaded end portion of the coupling member.

The other coupling member 15 has a threaded extension 16 at one end and an internally threaded recess 17 at the other end thereof. Extending into the recess and centrally disposed in the coupling member 15 is a conical projection 18 having a cylindrical end portion 19. The coupling member has a central bore 20 extending therethrough. The threaded recess 17 is so proportioned as to receive the threaded portion 14 of the coupling member 11. A collar 25 is loosely mounted on the tube 10 and is initially positioned on the end portion of the tube between the coupling members, as shown in Fig. 1. Collar 25 has a conical inner surface 26, the taper of this surface corresponding to the taper of the conical projection 18. The collar is preferably substantially as wide as the depth of the internal recess in the member 15 between the outer end of the conical projection and the inner end of the recess for reasons hereinafter described.

The end of the tube 10 is flared and the joint in the coupling member is made in the following manner: The parts are first positioned, as shown in Fig. 1, with the end of the tube 10 seated on the cylindrical portion 19 of the projection 18 and the collar 25 positioned between the coupling members. The coupling member 11 is then moved to the right to position the threaded end 14 in threaded engagement with the internally threaded recess 17. The coupling member 15 is then held stationary and the member 11 is rotated and at the same time pressure is maintained on the tube 10 in a direction to force the end of the tube on the conical projection 18.

As the member 11 is rotated the eccentricity of the portion 14 will cause the end of the tube 10 to be successively swaged or forced against the conical seat. In other words, successive circumferential portions in the direction of rotation of the member 11 will be flared outwardly by the combined longitudinal pressure on the tube and the successive pressure of these portions against the conical seat. Also the eccentricity of the bore through the portion 14 of the member 11 will cause the portion 27 of the tube to be reduced in section, as shown in Fig. 2. The collar 25 will prevent engagement between the end of the portion 14 and the end of the tube which would tend to twist or place a torsional strain on the tube during the formation of the flare thereon. It is obvious that the engagement of the collar with the end of the tube and the relative rotation permitted between the collar and the member 11 accomplish this result.

When the flare 28 on the end of the tube 10 has been completed, as shown in Fig. 2, the reduced portion 27 of the tube and the location of this reduced portion in back of the flare permits a limited lateral movement of the tube in the coupling member 11, thus permitting the flared portion 28 to seat on the outer conical surface of the projection 18 even though the bore in the threaded member 11 is eccentric with respect to the axis of the conical projection 18.

From the foregoing description it will be seen that the end of the tube 10 can be flared by the use of the coupling members 11 and 15 in conjunction with the collar 25 without requiring the use of any tools other than a wrench to rotate the member 11 and some means to hold the member 15 stationary. Furthermore, the method and means described do not place any torsional or twisting strain on the tube during the formation of the flare or the coupling of the tube end. When the flaring operation has been completed the flared end is firmly seated in the coupling and provides a leak-proof solderless joint. Due to the eccentricity through the coupling member 11 vibration of the coupling member and tube cannot loosen the joint. Moreover, the offset or bend in the end of the tube tends to absorb vibrations. The collar 25 can move laterally relative to the portion 14 of the member 11 and will thus center and seat itself on the conical projection 18.

Attention is called to the fact that the collar 25 in the final position shown in Fig. 2 prevents the end of the portion 14 of the member 11 from movement over the conical projection 18, which would tend to deform the end of the projection.

Although one method and one particular form of apparatus for carrying out the method have been shown and described it will be understood that changes may be made in the method and in the construction and arrangement of the cooperating parts without departing from the spirit or scope of the invention, as expressed in the following claims.

What I claim is:

1. Means for flaring and coupling the end of a tube of ductile metal comprising a pair of members having threaded portions arranged to interengage in threaded relation, one of said members having a bore to receive the tube, and the other member having a conical projection arranged to receive the end of the tube and the first named member having the axis of its bore offset from the axis of the threaded portion thereof, whereby as the conical projection is forced into the end of the tube by the advance of the thread a flare will be spun on the end of the tube.

2. Means for flaring and coupling the end of a tube of ductile metal comprising a pair of members having threaded portions arranged to interengage in threaded relation, one of said members having a bore to receive the tube, and the other member having a conical projection arranged to receive the end of the tube and the first named member having the axis of its bore offset from the axis of the threaded portion thereof, and a collar loosely mounted on the tube between the coupling members and arranged to engage the flared end of the tube and to prevent engagement of this end by the member having the offset threaded portion, whereby as the conical projection is forced into the end of the tube by the advance of the thread a flare will be spun on the end of the tube.

3. Means for flaring and coupling the end of a tube of ductile metal comprising a pair of members having threaded portions arranged to interengage in threaded relation, one of said members having a bore to receive the tube, and the other member having an inwardly extending recess and a conical projection disposed in said recess and arranged to receive the end of the tube and the first named member having the axis of its bore offset from the axis of the threaded portion thereof, whereby as the conical projection is forced into the end of the tube by the advance of the thread a flare will be spun on the end of the tube.

4. Means for flaring and coupling the end of a tube of ductile metal comprising a pair of members having threaded portions arranged to interengage in threaded relation, said members having bores to receive the tube, one member having an inwardly extending recess and a conical projection surrounding the bore and disposed in said recess and arranged to receive the end of the tube and the other member having its bore offset from the axis of the threaded portion therethrough, and a collar loosely mounted on the tube between the coupling members and arranged to engage the flared end of the tube and to prevent engagement of this end by the member having the offset threaded portion.

5. Means for flaring and coupling the end of a tube of ductile metal comprising a pair of members having threaded portions arranged to interengage in threaded relation, said members having bores to receive the tube, one member having an inwardly extending recess and a conical projection surrounding the bore and disposed in said recess and arranged to receive the end of the tube and the other member having its bore offset from the axis of the threaded portion therethrough, and a collar loosely mounted on the tube between the coupling members and arranged to engage the flared end of the tube and to prevent engagement of this end by the member having the offset threaded portion, said collar having an inner tapered surface corresponding to the taper of the conical projection.

6. Means for flaring and coupling the end of a tube of ductile metal comprising a pair of members having threaded portions arranged to interengage in threaded relation, said members having bores to receive the tube, one member having an inwardly extending recess and a conical projection surrounding the bore and disposed in said recess and arranged to receive the end of the tube and the other member having its bore offset from the axis of the threaded portion therethrough, and a collar loosely mounted on the tube between the coupling members and arranged to engage the flared end of the tube and to prevent engagement of this end by the member having the offset threaded portion, said collar having a width substantially equal to the distance from the outer end of the conical projection to the inner end of the recess.

7. Means for flaring and coupling the end of a tube of ductile metal comprising a pair of members having threaded portions arranged to interengage in threaded relation, said members having bores to receive the tube, one member having an inwardly extending recess and a conical projection surrounding the bore and disposed in said recess and arranged to receive the end of the tube and the other member having its bore offset from the axis of the threaded portion therethrough, and a collar loosely mounted on the tube between the coupling members and arranged to engage the flared end of the tube and to prevent engagement of this end by the member having the offset threaded portion, said collar having a width substantially equal to the distance from the outer end of the conical projection to the inner end of the recess and having an inner tapered surface corresponding to the taper of the conical projection.

8. Means for flaring the end of a tube of ductile metal comprising a pair of members having threaded portions arranged to interengage in threaded relation, one of said members having a bore to receive the tube, and the other member having a conical projection arranged to receive the end of the tube and the first named member having the axis of its threaded portion and the axis of the bore eccentric with respect to each other.

9. Means for flaring the end of a tube of ductile metal comprising a pair of members having threaded portions arranged to interengage in threaded relation, one of said members having a bore to receive the tube, and the other member having a conical projection arranged to receive the end of the tube, the end of said projection being cylindrical and dimensioned to receive the end of the tube, and the first named member having the axis of its threaded portion and the axis of its bore eccentric with respect to each other, whereby as the conical projection is forced into the end of the tube by the advance of the thread a flare will be spun on the end of the tube.

10. Means for flaring the end of a tube of ductile metal comprising a pair of members having threaded portions arranged to interengage in threaded relation, one of said members having a bore to receive the tube, and the other member having a conical projection arranged to receive the end of the tube the axis of said bore and the axis of said conical projection being eccentric with respect to each other, whereby as the conical projection is forced into the end of the tube by the advance of the thread a flare will be spun on the end of the tube.

STEPHEN GUARNASCHELLI.